(12) United States Patent
Abdullah et al.

(10) Patent No.: US 11,108,253 B2
(45) Date of Patent: Aug. 31, 2021

(54) DEVICE, BATTERY AND SYSTEM TO REDUCE BATTERY LEAKAGE

(71) Applicant: MOTOROLA SOLUTIONS, INC., Chicago, IL (US)

(72) Inventors: Mohd Faisal Abdullah, Pulau Pinang (MY); Wai Mun Lee, Perak (MY); Kow Chee Chong, Pulau Pinang (MY); Macwien Krishnamurhti, Selangor (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 160 days.

(21) Appl. No.: 16/226,293

(22) Filed: Dec. 19, 2018

(65) Prior Publication Data
US 2020/0203965 A1    Jun. 25, 2020

(51) Int. Cl.
| H02J 7/00 | (2006.01) |
| H01M 10/42 | (2006.01) |
| H02H 1/00 | (2006.01) |
| H02H 7/18 | (2006.01) |

(52) U.S. Cl.
CPC ......... *H02J 7/0029* (2013.01); *H01M 10/425* (2013.01); *H02H 1/0007* (2013.01); *H02H 7/18* (2013.01); *H01M 2010/4271* (2013.01); *H01M 2010/4278* (2013.01); *H02J 7/00302* (2020.01)

(58) Field of Classification Search
None
See application file for complete search history.

(56) References Cited

U.S. PATENT DOCUMENTS

| 6,329,874 | B1 | 12/2001 | Ye et al. |
| 6,545,447 | B1 | 4/2003 | Smith |
| 6,631,066 | B1 | 10/2003 | Smith et al. |
| 9,859,724 | B2 | 1/2018 | Choi et al. |
| 2010/0013394 | A1* | 1/2010 | West ................. H02J 7/0031 315/127 |
| 2010/0097118 | A1 | 4/2010 | Wang et al. |
| 2011/0045323 | A1 | 2/2011 | Ooi et al. |
| 2014/0068310 | A1 | 3/2014 | Sultenfuss et al. |

(Continued)

OTHER PUBLICATIONS

ISA/EP, International Search Report and Written Opinion, dated Mar. 13, 2020 re PCT International Patent Application No. PCT/US2019/062341.

*Primary Examiner* — Daniel S Gatewood
(74) *Attorney, Agent, or Firm* — Perry + Currier, Inc.

(57) ABSTRACT

A device, battery and system to reduce battery leakage is provided. The system includes a battery, a battery-powered device, and an interface therebetween comprising cell contacts and a data interface. The battery comprises: a cell; a low-power protection circuit; and a high-power protection circuit configured to receive an indication via the data interface that disables the high-power protection circuit, leaving the low-power protection circuit enabled. The battery-powered device comprises: a high-power subsystem used when the battery-powered device is in an operating state; a switch between the cell contacts and the high-power subsystem; and one or more sensing circuits configured to, in response to determining one or more of a power-off state and a low-battery state: open the switch to the high-power subsystem; and transmit, to the battery, via the data interface, the indication.

7 Claims, 8 Drawing Sheets

(56) References Cited

U.S. PATENT DOCUMENTS

2016/0049636 A1* 2/2016 Takano ................ H02J 7/0031
                                                        429/61
2018/0123364 A1   5/2018 Choi et al.

* cited by examiner

DEVICE, BATTERY AND SYSTEM TO REDUCE BATTERY LEAKAGE

BACKGROUND OF THE INVENTION

Battery-powered devices may include circuits and/or electronics which draw current from a battery even when the device is in an off-state, which leads to battery drainage. Once a battery is drained, the battery cells (e.g. Li ion cells) degrade and the degradation may be irreversible thereby reducing battery life.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Battery-powered devices may include circuits and/or electronics which draw current from a battery even when the device is in an off-state, which leads to battery drainage. Once a battery is drained, the battery cells (e.g. Li ion cells) degrade and the degradation may be irreversible thereby reducing battery life. Hence, many battery-powered devices used in hazardous environments, such as HAZLOC (hazardous location) radios, have a specification to be stored at a minimum charging level. However, due to the leakage, the minimum charging level may be challenging to maintain. The problem is exacerbated via the HAZLOC batteries including active protection circuits that draw power, but which prevent sparking due to power surges at cell contacts.

An aspect of the specification provides a system comprising: a battery, a battery-powered device, and an interface therebetween comprising cell contacts and a data interface, the battery comprising: a cell; a low-power protection circuit; and a high-power protection circuit configured to receive an indication via the data interface that disables the high-power protection circuit, leaving the low-power protection circuit enabled, the battery-powered device comprising: a high-power subsystem used when the battery-powered device is in an operating state; a switch between the cell contacts and the high-power subsystem; and one or more sensing circuits configured to, in response to determining one or more of a power-off state and a low-battery state: open the switch to the high-power subsystem; and transmit, to the battery, via the data interface, the indication.

Another aspect of the specification provides a battery comprising: a cell; a low-power protection circuit; a high-power protection circuit; and an interface comprising cell contacts and a data interface, the high-power protection circuit configured to: receive a first indication via the data interface that disables the high-power protection circuit, leaving the low-power protection circuit enabled; and receive a second indication via the data interface that enables the high-power protection circuit, leaving the low-power protection circuit enabled.

Another aspect of the specification provides a battery-powered device comprising: battery-cell contacts; a high-power subsystem used in an operating state; a switch between the battery-cell contacts and the high-power subsystem; and a sensing circuit configured to: in response to determining one or more of a power-off state and a low-battery state: open the switch to the high-power subsystem; and in response to determining a power-on state: close the switch to the high-power subsystem to place the high-power subsystem into the operating state.

Figure 1:
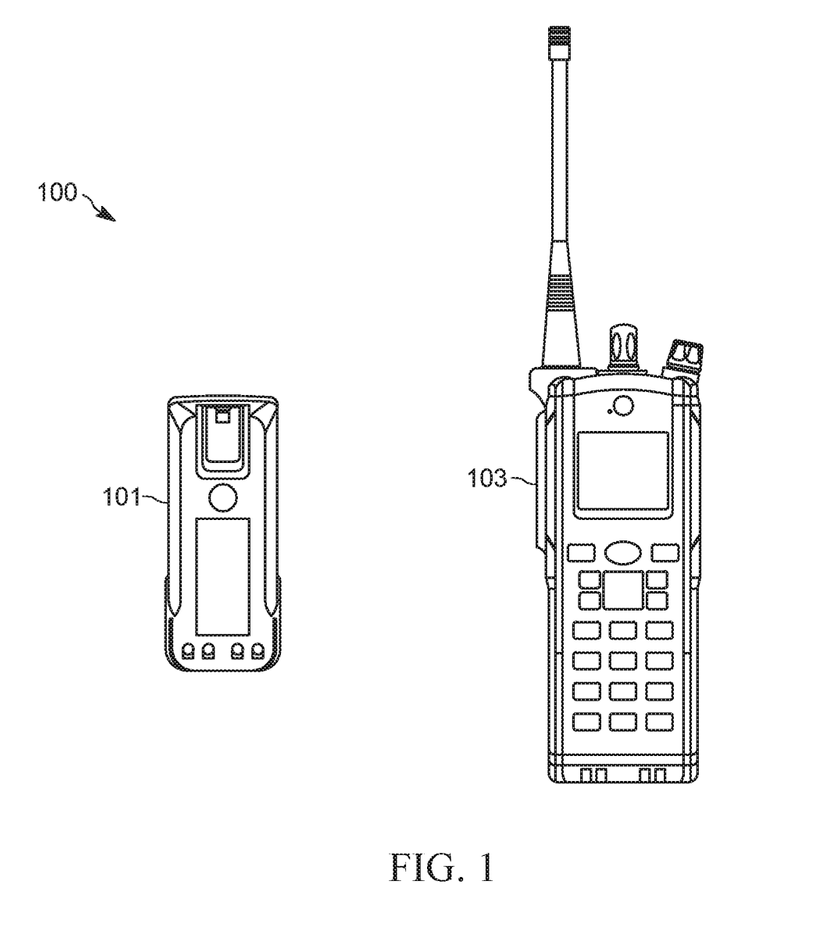
FIG. 1 depicts a system that includes a battery and a battery-powered device, each configured to reduce battery leakage, in accordance with some examples.

Attention is directed to FIG. 1, which depicts a perspective view of an example system 100 that includes a battery 101 and a battery-powered device 103. The battery-powered device 103 is interchangeably referred to hereafter as the device 103. While as depicted the battery 101 and the device 103 are separate from one another, the battery 101 and the device 103 are generally configured to mate such that the battery 101 powers the device 103, as described in more detail below.

As depicted, the device 103 comprises a hazardous location (HAZLOC) radio, and the battery 101 comprise a HAZLOC battery, each for use in mines and/or other hazardous locations where sparks and the like may cause explosions and the like. As will be described below, both the battery 101 and the device 103 are generally adapted to reduce battery leakage, when the device 103 is used with the battery 101, or another battery, and/or when the battery 101 is used with the device 103 and/or another device. Furthermore, in other examples, the battery 101 and/or the device 103 may be adapted for use in non-hazardous locations, for example to prevent sparking when the battery 101 is mated with the device 103 and/or when the device 103 is turned on. Furthermore, the device 103 may not be a radio, but may be any type of device powered by the battery 101 and/or another battery, for use in hazardous locations and/or for use in non-hazardous locations.

Figure 2A:
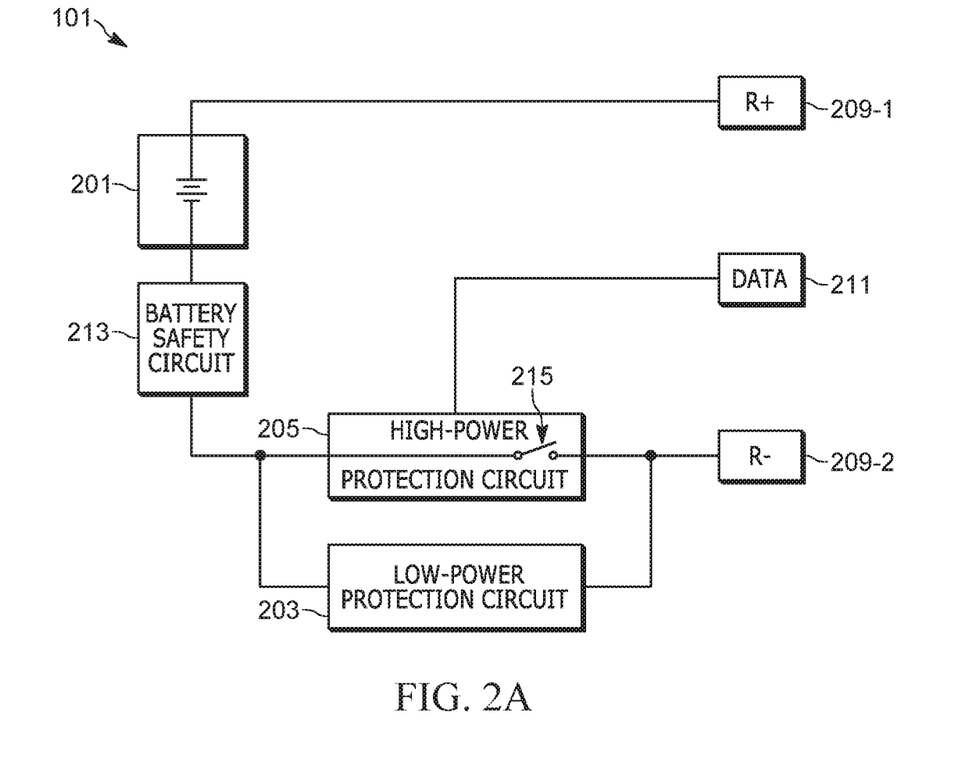
FIG. 2A is a device diagram showing an example structure of the battery of FIG. 1, in accordance with some examples.

Attention is next directed to FIG. 2A, which depicts a schematic block diagram of an example of the battery 101 when detached from the device 103.

As depicted in FIG. 2A, the battery 101 comprises: a cell 201; a low-power protection circuit 203; a high-power protection circuit 205; and an interface comprising cell contacts 209-1, 209-2 and a data interface 211. The cell contacts 209-1, 209-2 are interchangeably referred to hereafter, collectively, as the cell contacts 209 and, generically, as a cell contact 209.

For example, the cell 201 may comprises a lithium ion cell which, while having a high energy density, may be particularly vulnerable to degradation due to both overcharging and over-discharging (e.g. drainage). However, lithium ion cells are understood to be an example, and the cell 201 may be any suitable type of cell including, but not limited to, one or more lithium ion cells.

As depicted, to assist with preventing overcharging, the battery further comprises a battery safety circuit 213 configured to protect the cell 201 from overcharging, and the like during charging.

As depicted, the cell contact 209-1 (e.g. a "+" contact), the cell 201, the battery safety circuit 213, the high-power protection circuit 205 and the cell contact 209-2 are connected in series. When the cell contacts 209 are in contact with corresponding contacts in the device 103, the cell 201 powers the device 103. When the cell contacts 209 are in contact with corresponding contacts in a charger (e.g. a multi-unit charger (MUC) and/or a single-unit charger (SUC), the cell 201 is charged (e.g. via battery safety circuit 213 which protects the cell 201 from overcharging).

As depicted, the low-power protection circuit 203 is connected in parallel to the high-power protection circuit 205. While, as depicted, the low-power protection circuit 203 and the high-power protection circuit 205 are connected in parallel to the cell contacts 209, it is understood that the battery 101 may comprise other components between the circuits 203, 205 and the cell contacts 209, for example the battery safety circuit 213 and/or any other suitable component and/or circuit, including, but not limited to, another battery safety circuit, a "fuel" gauge circuit, and the like. Indeed, while as depicted the circuits 203, 205 are between the cell 201 and the cell contact 209-2, in other examples, the circuits 203, 205 may be between the cell 201 and the cell contact 209-1.

Each of the circuits 203, 205 are configured to prevent power surges at the contacts 209 to prevent sparking and the like at the contacts 209.

However, the high-power protection circuit 205 comprises an active high-power, high-leakage protection circuit and the low-power protection circuit 203 comprises a passive low-power, low-leakage protection circuit.

Hence, for example, the high-power protection circuit 205 draws power from the cell 201 (e.g. to power, transistors, switches, capacitors and the like) to prevent power surges at the contacts 209 which may lead to the cell 201 being drained, for example when the battery 101 is stored and/or the device 103 is in off state. The high-power protection circuit 205 has the advantage, however, of having low enough impedance to provide sufficiently high power to the device 103 to operate the device 103 in an operating state, while also preventing prevent power surges at the contacts 209. Hence, the high-power protection circuit 205 may alternatively be referred to as a low-impedance protection circuit, for example having a lower impedance than the low-power protection circuit 203, as explained hereafter. Similarly, the low-power protection circuit 203 may alternatively be referred to as a high-impedance protection circuit, for example having a higher impedance than the high-power protection circuit 205.

In contrast, the low-power protection circuit 203 may comprise a passive circuit (e.g. one or more resistors) which does not draw power from the cell 201. For example, attention is directed to FIG. 2B which depicts an example of a low-power protection circuit 203-1 (e.g. a high-impedance protection circuit) which comprises one or more resistors 253. The resistance of the one or more resistors 253 may be selected to provide enough power to the device 103 to start-up and/or to limit inrush current to the device 103 upon start-up (e.g. to prevent sparking). In a particular implementation, the resistance of the one or more resistors 253 may be between about 3 ohms and about 400 ohms.

Alternatively, the low-power protection circuit 203 may comprise an active circuit (and/or an active-passive "hybrid" circuit which includes a current-limiting integrated circuit. For example, attention is directed to FIG. 2C which depicts an example of a low-power protection circuit 203-2 (e.g. a high-impedance protection circuit) which comprises a current-limiting integrated circuit (IC) 261, a fuse 262 and one or more resistors 263 connected in series. The IC 261 generally limits current to the device 103, for example to limit inrush current into the device 103 to prevent sparking. The current rating of the fuse 262 is also selected to limit inrush current into the device 103 to prevent sparking. Indeed, the fuse 262 may be optional but generally acts as a backup to the IC 261 to ensure that inrush current does not exceed the current rating of the fuse 262. The fuse 262 may be a passive fuse such that, when the fuse 262 blows, the fuse 262 is to be manually changed. The resistance of the one or more resistors 263 may also be selected to provide enough power to the device 103 to start-up and/or to limit inrush current to the device 103 upon start-up (e.g. to prevent sparking) and/or when the battery 101 and the device 103 are mated and/or unmated (e.g. the battery 101 is inserted into the device 103 and/or removed from the device 103). In particular, the resistance of the one or more resistors 263 may be selected based on the total capacitance of the device 103 such that the current from the battery 101 is limited to due a time constant which results from the resistance of the one or more resistors 263 and the total capacitance of the device 103. Hence, the resistance of the one or more resistors 263 may be selected such that a given time constant is achieved to limit inrush current. Hence, each of the IC 261, the fuse 262 and the one or more resistors 263 may assist in preventing sparking between the battery 101 and the device 103. In a particular example, the resistance of the one or more resistors 263 is about 3 ohms.

Figure 2B:
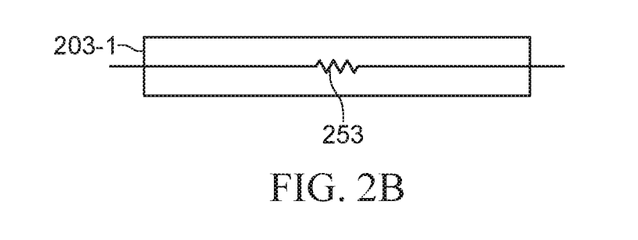
FIG. 2B is a device diagram showing an example structure of a low-power protection circuit of FIG. 2A, in accordance with some examples.
Figure 2C:
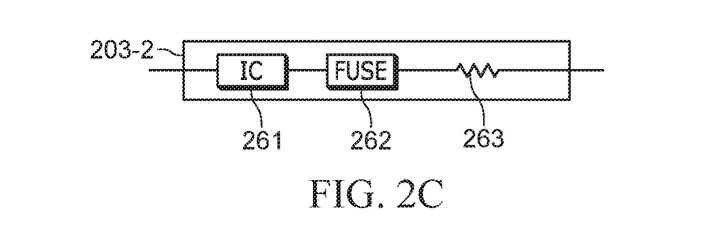
FIG. 2C is a device diagram showing another example structure of a low-power protection circuit of FIG. 2A, in accordance with some examples.

Hence, the low-power protection circuit 203 has higher impedance than the high-power protection circuit 205 (e.g. the resistance of the high-power protection circuit 205 may be on the order of milliohms), and limits inrush current at the contacts 209 to prevent sparking. Furthermore, the low-power protection circuit 203 does not draw as much power from the cell 201 as the high-power protection circuit 205. For example, when the low-power protection circuit 203 comprises the low-power protection circuit 203-1, the low-power protection circuit 203 is passive and uses minimal and/or no energy. Furthermore, when the low-power protection circuit 203 comprises the low-power protection circuit 203-1, current-limiting ICs, such as the IC 261, are generally very low power devices (e.g. as compared to the high-power protection circuit 205) and uses minimal energy and/or very low energy as compared to the high-power protection circuit 205.

Figure 2D:
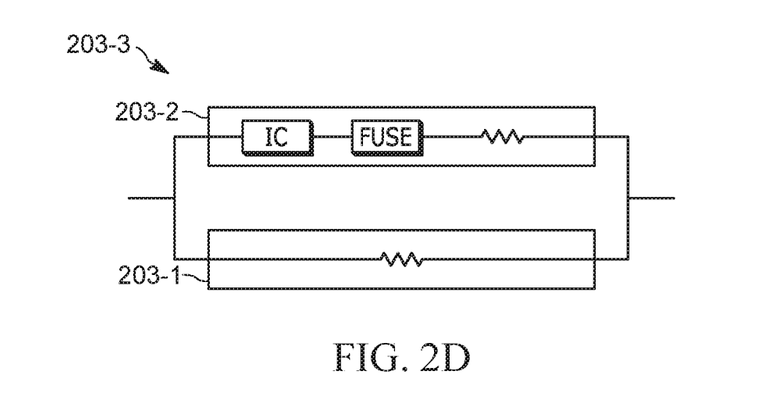
FIG. 2D is a device diagram showing another example structure of a low-power protection circuit of FIG. 2A, in accordance with some examples.

In yet further examples, the low-power protection circuit 203 may comprise a combination of the low-power protection circuit 203-1 and the low-power protection circuit 203-2, for example connected in parallel. For example, attention is directed to FIG. 2D which depicts an example of a low-power protection circuit 203-2 (e.g. a high-impedance protection circuit) which comprises the low-power protection circuit 203-1 and the low-power protection circuit 203-2, for example connected in parallel. In these examples, the impedance (e.g. about 400 ohms in a particular example) of the low-power protection circuit 203-1 is higher than the impedance (e.g. about 3 ohms in a particular example) of the low-power protection circuit 203-2 such that current from the cell 201 is provided to the cell contacts 209 via the low-power protection circuit 203-2 (e.g. when the high-power protection circuit 205 is disabled). Hence, in these examples, when the fuse 262 blows in the low-power protection circuit 203-1, the low-power protection circuit 203-2 may act as a backup to provide power to the device 103, for example when the high-power protection circuit 203-3 is disabled.

However, while the low-power protection circuit 203 does not drain the cell 201 and/or does not drain the cell 201 as quickly as the high-power protection circuit 205, the low-power protection circuit 203 is generally unable to provide sufficient power to the device 103 to operate the device 103 in an operating state; the impedance of the low-power protection circuit 203 may, however, to selected to provide sufficient power to the device 103 to operate the device 103 in an initial power-up state, as described in more detail below.

The high-power protection circuit 205 may be enabled or disabled. For example, the high-power protection circuit 205 is connected to the data interface 211 and is configured to: receive a first indication via the data interface 211 that disables the high-power protection circuit 205, leaving the low-power protection circuit 203 enabled; and receive a second indication via the data interface 211 that enables the high-power protection circuit 205, leaving the low-power protection circuit 203 enabled.

Hence, for example, the high-power protection circuit 205 may include a switch 215, and the like (e.g. a field effect transistor (FET)) connected to the cell contact 209-2 which may be opened (as depicted) or closed by the high-power protection circuit 205 depending on indications received via the data interface 211. For example, the first indication that disables the high-power protection circuit 205 may comprise a data-low signal which causes the switch 215 to be opened; similarly, the second indication that enables the high-power protection circuit 205 may comprise a data-high signal which causes the switch 215 to be closed. For example, the indications may be received at the high-power protection circuit 205 via the data interface 211 from a device with which the battery 101 is mated, for example the device 103 and/or a charger.

However, the low-power protection circuit 203 is enabled regardless of whether the high-power protection circuit 205 is enabled or disabled.

When the battery 101 is mated with the device 103, the cell contacts 209 of the battery 101 are mated with corresponding contacts of the device 103, and the data interface 211 may further be mated with a corresponding data interface of the device 103. When the high-power protection circuit 205 is disabled, the battery 101 provides power to the device 103 via the low-power protection circuit 203, however at a low power. When the high-power protection circuit 205 is enabled, the battery 101 provides power to the device 103 via the high-power protection circuit 205 (e.g. as the high-power protection circuit 205 has lower impedance than the low-power protection circuit 203) at a higher power than the low power provided by the low-power protection circuit 203.

For example, when the high-power protection circuit 205 is enabled while the battery 101 is providing power to the device 103, the device 103 may be turned off via a power switch and/or the device 103 may detect a low-battery state (e.g. the power of the battery is at or below a threshold power level (e.g. as measured via the cell contacts 209)). The device 103 may thereafter transmit a first indication to the high-power protection circuit 205 via the data interface 211 (and a corresponding data interface of the device 103) to disable the high-power protection circuit 205 (e.g. by opening the switch 215).

When the device 103 is turned on, and the high-power protection circuit 205 is initially disabled, the power provided to the device 103 by the low-power protection circuit 203 may not be sufficient to operate the device 103 in an operating state. However, the impedance of the low-power protection circuit 203 is generally selected to provide sufficient power to turn the device 103 on and/or for the device 103 to execute an initial power-up sequence. Once turned on, and/or once the initial power sequence is executed, the device 103 may thereafter transmit a second indication to the high-power protection circuit 205 via the data interface 211 (and a corresponding data interface of the device 103) to enable the high-power protection circuit 205 (e.g. by closing the switch). Thereafter the device 103 is sufficiently powered via the high-power protection circuit 205 to operate normally, for example in an operating state.

Figure 3A:
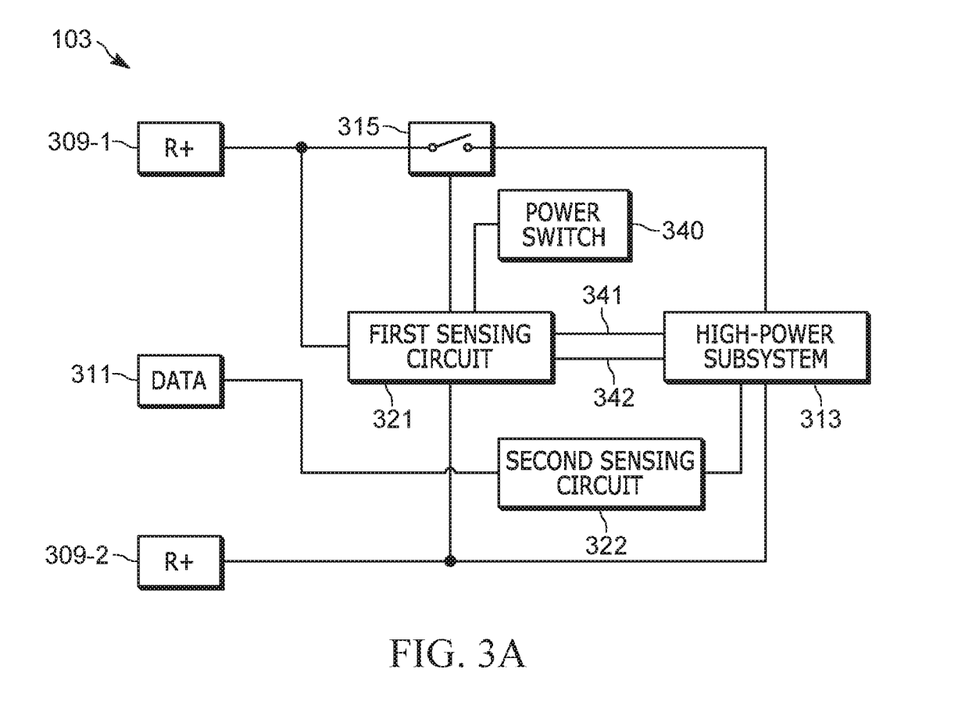
FIG. 3A is a device diagram showing an example structure of the battery-powered device of FIG. 1, in accordance with some examples.

Attention is next directed to FIG. 3A, which depicts a schematic block diagram of an example of the device 103 when detached from the battery 101.

As depicted in FIG. 3A, the device 103 comprises: battery-cell contacts 309-1, 309-2 (interchangeably referred to hereafter, collectively, as the cell contacts 309-1, 309-2 and, generically, as a cell contact 309-1); a data interface 311; a high-power subsystem 313 used in an operating state; a switch 315 between the battery-cell contacts 309 and the high-power subsystem 313; and a first sensing circuit 321 configured to: in response to determining one or more of a power-off state and a low-battery state: open the switch 315 to the high-power subsystem 313; and in response to determining a power-on state: close the switch 315 to the high-power subsystem 313 to place the high-power subsystem 313 into the operating state.

The high-power subsystem 313 may comprise any suitable combination of processors, transceivers and the like for operating the device 103; the high-power subsystem 313 may further comprise a power management integrated circuit (PMIC) and the like.

The switch 315 may comprise a FET, a PFET (p-channel FET) and the like. While the switch 315 is depicted as being connected to the cell contact 309-1, the switch 315 may alternatively be connected to the cell contact 309-2.

The first sensing circuit 321 may comprise any suitable arrangement of capacitors, resistors, transistors and the like that performs the functionality of the first sensing circuit 321 as described herein. As depicted, the first sensing circuit 321 includes connections to the cell contacts 309 such that a voltage and/or power of the battery 101 (e.g. the cell 201) may be determined and/or detected by the first sensing circuit 321 when the battery 101 is mated with the device 103.

As depicted, the device 103 further comprises a second sensing circuit 322 configured to, in response to determining one or more of a power-off state and a low-battery state, transmit, to the battery 101 via the data interface 311 (e.g. when the data interfaces 211, 311 are in contact when the battery 101 is mated with the device 103), an indication that disables the high-power protection circuit 205, leaving the low-power protection circuit 203 enabled. As describe below, the second sensing circuit 322 may comprise any suitable electronics for determining and/or detecting one or more of a power-off state and a low-battery state for example via communications with the high-power subsystem 313 and responsively controlling the high-power protection circuit 205.

While the second sensing circuit 322 is depicted as separate from the first sensing circuit 321, the sensing circuits 321, 322 may alternatively be combined.

Put another way, the device 103 comprises one or more sensing circuits 321, 322 configured to, in response to determining one or more of a power-off state and a low-battery state: open the switch 315 to the high-power subsystem 313; and transmit, to the battery 101, via the data interface 311, an indication that disables the high-power protection circuit 205, leaving the low-power protection circuit 203 enabled. In particular, the one or more sensing circuits 321, 322 may comprise the first sensing circuit 321 in communication with the high-power subsystem 313, the first sensing circuit 321 configured to: determine, via communications with the high-power subsystem 313, one or more of the power-off state and the low-battery state; and, in response to determining one or more of the power-off state and the low-battery state: open the switch 315 to the high-power subsystem 313.

Similarly, the one or more sensing circuits 321, 322 may comprises the second sensing circuit 322 in communication with the high-power subsystem 313, the second sensing circuit 322 configured to: determine and/or detect, via communications with the high-power subsystem 313, one or more of the power-off state and the low-battery state; and, in response to determining and/or detecting one or more of the power-off state and the low-battery state: transmit, to the battery 101, via the data interface 311, the indication to disable the high-power protection circuit 205, leaving the low-power protection circuit 203 enabled.

As depicted, the device 103 further comprises a power switch 340 (e.g. a power-on switch) in communication with the first sensing circuit 321. The power switch 340 may be used to turn the device 103 on and off, for example as activated by a user of the device 103. While not depicted, the power switch 340 may comprise a further switch that connects the first sensing circuit 321 to the contacts 309; when the power switch 340 is activated to turn the device 103 on, switch that connects the first sensing circuit 321 to the contacts 309 is closed thereby powering the first sensing circuit 321.

The power switch 340, when activated to turn the device 103 on, may provide a signal to the first sensing circuit 321 that power from the battery 101 is to be used to turn the device 103 on. Such a signal may be provided by way of the connecting the first sensing circuit 321 to the contacts 309 and/or the battery 101. The first sensing circuit 321 may responsively close the switch 315 to power the high-power subsystem 313.

Put another way, the one or more sensing circuits 321, 322 (e.g. as depicted the first sensing circuit 321) may be further configured to: in response to determining a power-on state, close the switch 315 between the cell contacts 309 and the high-power subsystem 313. In particular the one or more sensing circuits 321, 322 (e.g. as depicted the first sensing circuit 321) are in communication with the power switch 340 of the battery-powered device 103, the one or more sensing circuits 321, 322 (e.g. as depicted the first sensing circuit 321) further configured to determine the power-on state via communications with the power switch 340 (e.g. by way of the power switch 340 connecting the first sensing circuit 321 to the contacts 309 and/or the battery 101).

Figure 3B:
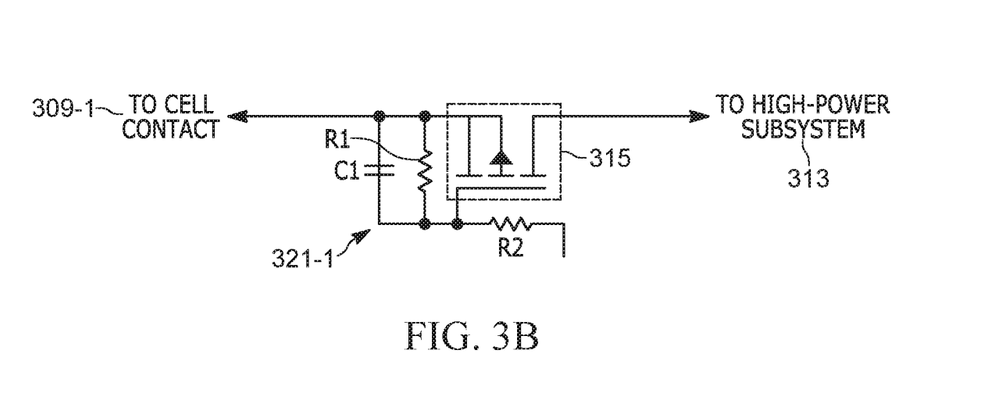
FIG. 3B depicts detail of an example switch and a portion of an example sensing circuit of FIG. 3A, in accordance with some examples.

As described above, however, the first sensing circuit 321 may comprise any suitable arrangement of capacitors, resistors, transistors and the like that performs the functionality of the first sensing circuit 321. For example, attention is directed to FIG. 3B which depicts an example of the switch and detail of a portion 321-1 of an example of the first sensing circuit 321. In particular, the depicted portion 321-1 comprises a capacitor C1 and a resistor R1 connected in parallel from the cell contact 309-1 to a gate of the FET of the switch 315, via a resistor R2. The capacitance of the capacitor C1 and the resistance of the resistors R1, R2 are selected to provide a suitable time constant for turning on the switch 315 (e.g. providing a voltage to the gate of the FET of the switch 315) to limit inrush current into the device 103. While the low-power protection circuit 203 of the battery 101 may also limit inrush current, the depicted portion 321-1 may also limit inrush current, for example when a battery without the low-power protection circuit 203 is used with the device 103. However, while one capacitor C1 and two resistors R1, R2 are depicted, the first sensing circuit 321 may comprise any suitable combination of one or more capacitors and one or more resistors to provide a time constant such that the switch 315 is closed over a time period determined by the time constant to limit inrush current from the battery 101.

Hence, returning to FIG. 3A, the combination of such capacitors and resistors of the first sensing circuit 321 inherently provide a time constant, for example for activating the switch 315. As such, the one or more sensing circuits 321, 322 (e.g. as depicted the first sensing circuit 321) include a time constant such that the switch 315 is closed over a time period determined by the time constant to limit inrush current. The time constant may further allow the first sensing circuit 321 to draw sufficient power from the battery 101 via the cell contacts 309 to close the switch 315, while further limiting inrush current into the device 103 to prevent sparking at the cell contacts 309. Indeed, as described above, the battery 101 may initially be providing power via the low-power protection circuit 203 and hence, the power available to the device 103 and/or the first sensing circuit 321 may be low, as compared to when the high-power protection circuit 205 is providing power. Hence, the time constant allows time for the first sensing circuit 321 to draw sufficient power from the battery 101 via the cell contacts 309 to close the switch 315 using the lower power available from the low-power protection circuit 203 as well as limiting inrush current to prevent sparking.

However, in some examples, when the power-on state is detected (e.g. via the power switch 340), the one or more sensing circuits 321, 322 (e.g. as depicted the first sensing circuit 321) may detect a low-battery state of the battery 101, for example by measuring a voltage across the cell contacts 309. For example, the measured voltage may be lower than a threshold voltage (e.g. below which the power from the battery 101 may not be sufficient to power the high-power subsystem 313). Hence, the one or more sensing circuits 321, 322 (e.g. as depicted the first sensing circuit 321) may be further configured to: in response to determining both a power-on state and a low-battery state: not close the switch 315 and/or power-down the battery-powered device 103 (e.g. if any components of the device 103 are connected to the contacts 309 not via the switch 315).

Returning to the power-on sequence, as depicted, the high-power subsystem 313 is further in communication with the second sensing circuit 322. Assuming that the battery 101 is initially providing power to the device 103 via the low-power protection circuit 203, for example after the switch 315 is closed, the low-power protection circuit 203 is initially powered with sufficient power to implement an initial power-on sequence. During the initial power-on sequence, the high-power subsystem 313 may provide a signal, and the like, to the second sensing circuit 322 to cause the second sensing circuit 322 to transmit, via the data interface 311, to the high-power protection circuit 205, an indication (e.g. a data-high signal) to enable the high-power protection circuit 205 as described above. Thereafter the battery 101 is provides power to the device 103 via the high-power protection circuit 205 enabling the high-power subsystem 313 to complete a power-on sequence and thereafter operate in an operating state.

Put another way, the one or more sensing circuits 321, 322 may be further configured to: in response to determining a power-on state, transmit, to the battery 101, via the data interface 311, an indication to enable the high-power protection circuit 205.

As depicted, the first sensing circuit 321 is in communication with the high-power subsystem 313 via a first connection 341 and a second connection 342. The connections 342, 342 may be with ports of the high-power subsystem 313 to exchange different types of data and/or signals. For example, the connection 341 may be for the high-power subsystem 313 to transmit an indication to the first sensing circuit 321 that the high-power subsystem 313 is in a state where the high-power subsystem 313 may be turned off; and the connection 342 may be for the high-power subsystem 313 and the first sensing circuit 321 to exchange watchdog timer indications and/or to cause a power-down and/or reset of the device 103.

The power switch 340 may also be used to turn off the device 103. However, when the device 103 turns off, a PMIC of the high-power subsystem 313 may manage a power-down sequence of the device 103 and/or the high-power subsystem 313. During the power-down sequence, the high-power subsystem 313 continues to draw power from the battery 101 to complete the power-down sequence for example to turn off components of the device 103 in a sequence. Once the power-down sequence is completed, the high-power subsystem 313 may transmit an indication and/or signal to the first sensing circuit 321 via the connection 341 which causes the first sensing circuit 321 to open the switch 315.

In addition, as part of the power-down sequence, the high-power subsystem 313 may provide a signal to the second sensing circuit 322 to cause the second sensing circuit 322 to transmit, via the data interface 311, to the high-power protection circuit 205, an indication (e.g. a data-low signal) to disable the high-power protection circuit 205 as described above. The high-power subsystem 313 may provide such a signal to the second sensing circuit 322 prior to transmitting the indication and/or signal to the first sensing circuit 321 via the connection 341 to cause the first sensing circuit 321 to open the switch 315.

Similar signaling and/or transmission of indications may occur to power down the device 103 when a low-battery state is detected. In these examples, while the device 103 is in an operating state, the first sensing circuit 321 may continue to monitor the voltage of the battery 101, and when the low-battery state is detected the first sensing circuit 321 may indicate to the high-power subsystem 313, for example via the connection 341, to begin a power-down sequence, which includes the high-power subsystem 313 providing a signal to the second sensing circuit 322 to cause the second sensing circuit 322 to transmit an indication to disable the high-power protection circuit 205 as described above.

Furthermore, when a power-on state and a low-battery state are both detected (e.g. the low-battery state is detected when the power switch 340 is activated), the one or more sensing circuits 321, 322 may be further configured to: in response to determining both a power-on state and a low-battery state: not transmit an indication to enable the high-power protection circuit 205, thereby leaving the high-power protection circuit 205 disabled and the low-power protection circuit 203 enabled.

Figure 4:
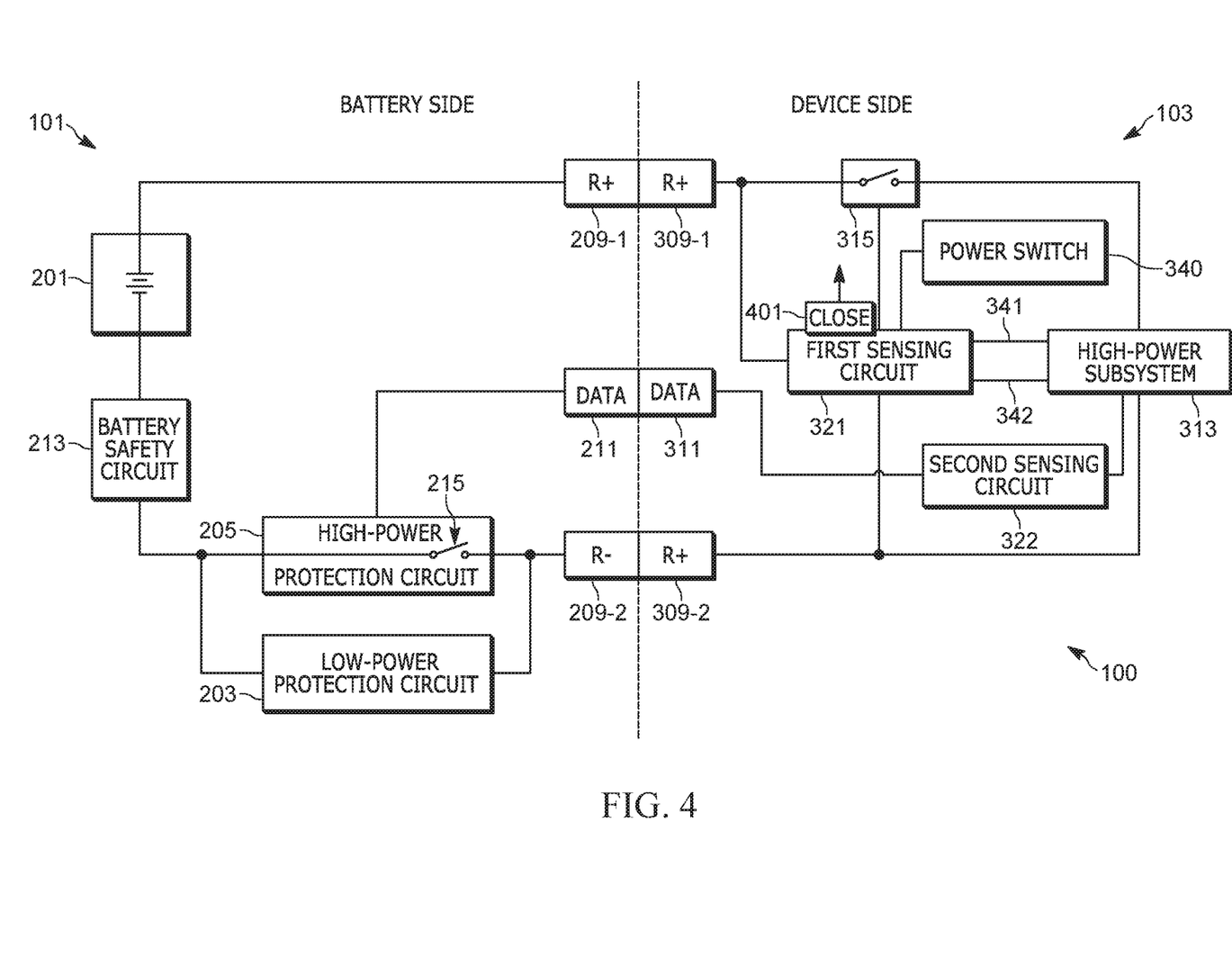
FIG. 4 is a device diagram showing an example structure of the battery and the battery-powered device of FIG. 1 mated via an interface therebetween, in accordance with some examples.

Attention is next directed to FIG. 4, which depicts a schematic block diagram of the system 100 when the battery 101 is mated with the device 103. As depicted, for example, the system 100 comprises an interface between the battery 101 and the device 103, the interface comprising cell contacts and a data interface for example when the cell contacts 209, 309 are mated and the data interfaces 211, 311 are mated. Furthermore, when the battery 101 is initially mated to the device 103, the high-power protection circuit 205 may be disabled and the low-power protection circuit 203 is providing power to the device 103; regardless, the circuit 203, 205 providing power (and/or current) to the device 103 is dependent on the impedance of the circuits 203, 205 (e.g. according to Ohm's law) and/or whether or not the high-power protection circuit 205 is enabled or disabled.

For example, in FIG. 4, the device 103 is initially in an off-state and the high-power protection circuit 205 is disabled (e.g. the switch 215 is open). When the power switch 340 is activated, power is supplied to the first sensing circuit 321 (e.g. via another switch, and the like) from the battery 101 via the low-power protection circuit 203, a capacitor, and the like, of the first sensing circuit 321 providing a power 401 and/or voltage, and the like, to the switch 315 (e.g. to the gate of the FET of the switch 315) to cause the switch 315 to close. The power 401 and/or voltage may be provided automatically when the battery 101 is mated to the device 103 and/or when the power switch 340 is turned on. The power 401 and/or voltage is further provided according to the time constant of the capacitor C1 and the resistors R1, R2 such that inrush current is limited to prevent sparking. The inrush current may also be limited to by time constant provide by the combination of the resistance of the low-power protection circuit 203 and the total capacitance of the device 103.

Figure 5:
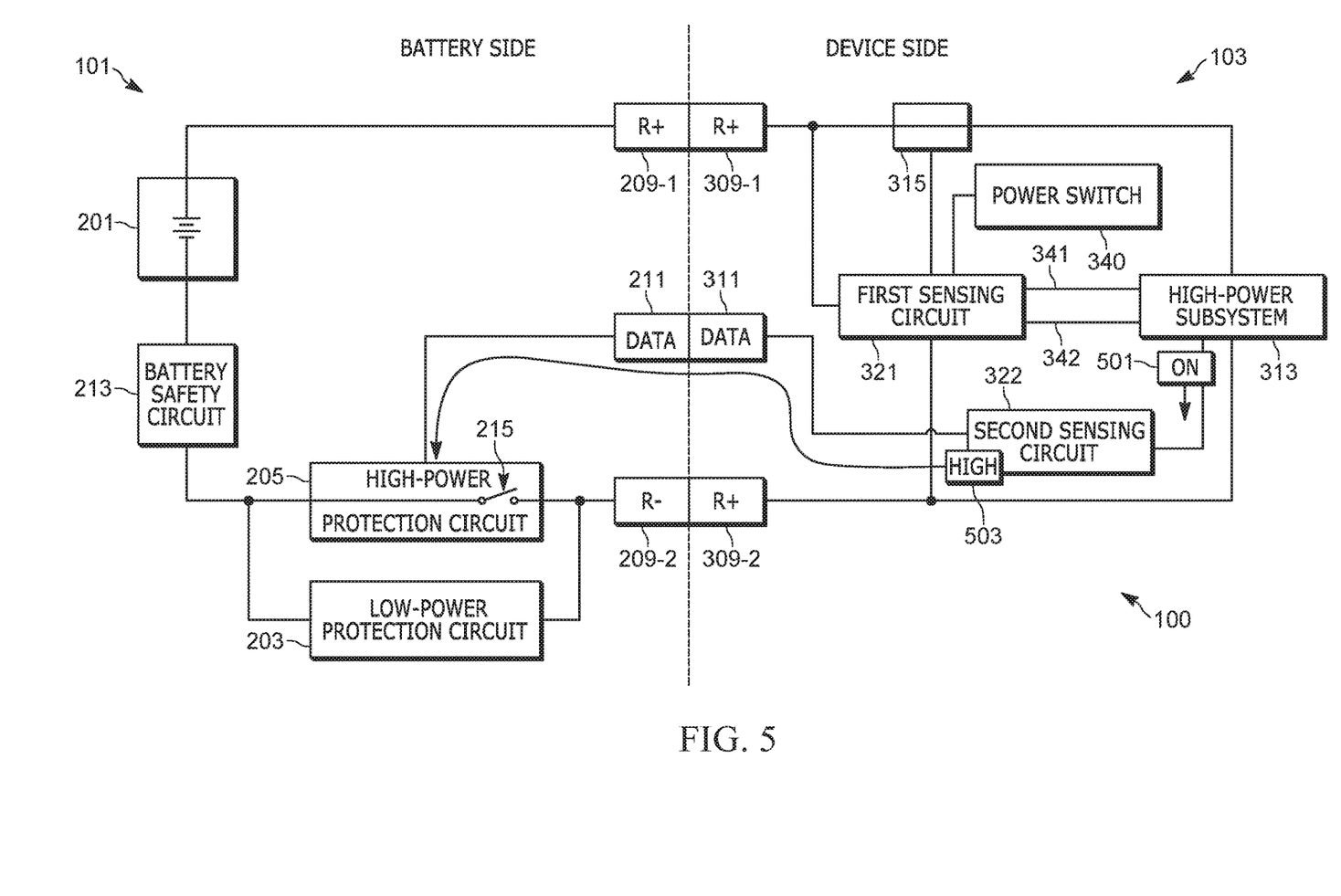
FIG. 5 depicts the example structure of the battery and the battery-powered device of FIG. 4 when powering up, in accordance with some examples.

Attention is next directed to FIG. 5 which is substantially similar to FIG. 4 with like components having like numbers. However, in FIG. 5, the switch 315 is closed in response to the power 401 and/or voltage received as depicted in FIG. 4. The switch 215 remains open, however, such that the high-power subsystem 313 is powered via the low-power protection circuit 203, and the high-power subsystem 313 is executing an initial power-up sequence which includes, but is not limited to, the high-power subsystem 313 transmitting an "ON" signal 501 and/or indication to the second sensing circuit 322 which in turn causes the second sensing circuit 322 to transmit an indication 503 (e.g. a data-high signal) via the data interfaces 211, 311 to enable the high-power protection circuit 205 (e.g. to cause the switch 215 to close).

Figure 6:
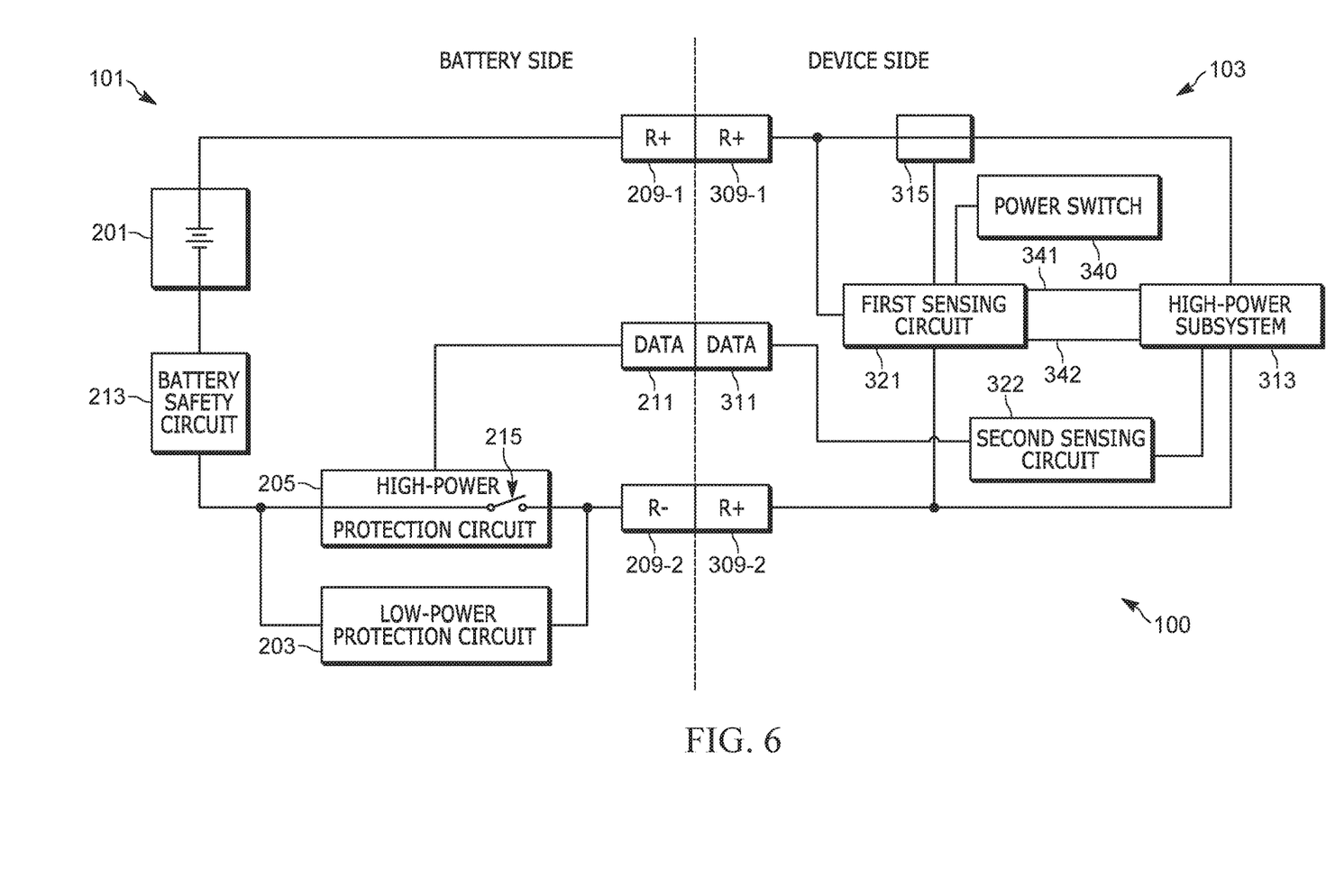
FIG. 6 depicts the example structure of the battery and the battery-powered device of FIG. 4 when powered up, in accordance with some examples.

For example, attention is next directed to FIG. 6 which is substantially similar to FIG. 5 with like components having like numbers. However, in FIG. 6, the switch 215 is closed in response to the indication 503 (e.g. received from the device 103 when the device 103 powers up, and the like, as depicted in FIG. 5) and the high-power subsystem 313 may have completed the power-up sequence once powered by the battery 101 via the high-power protection circuit 205.

Figure 7:
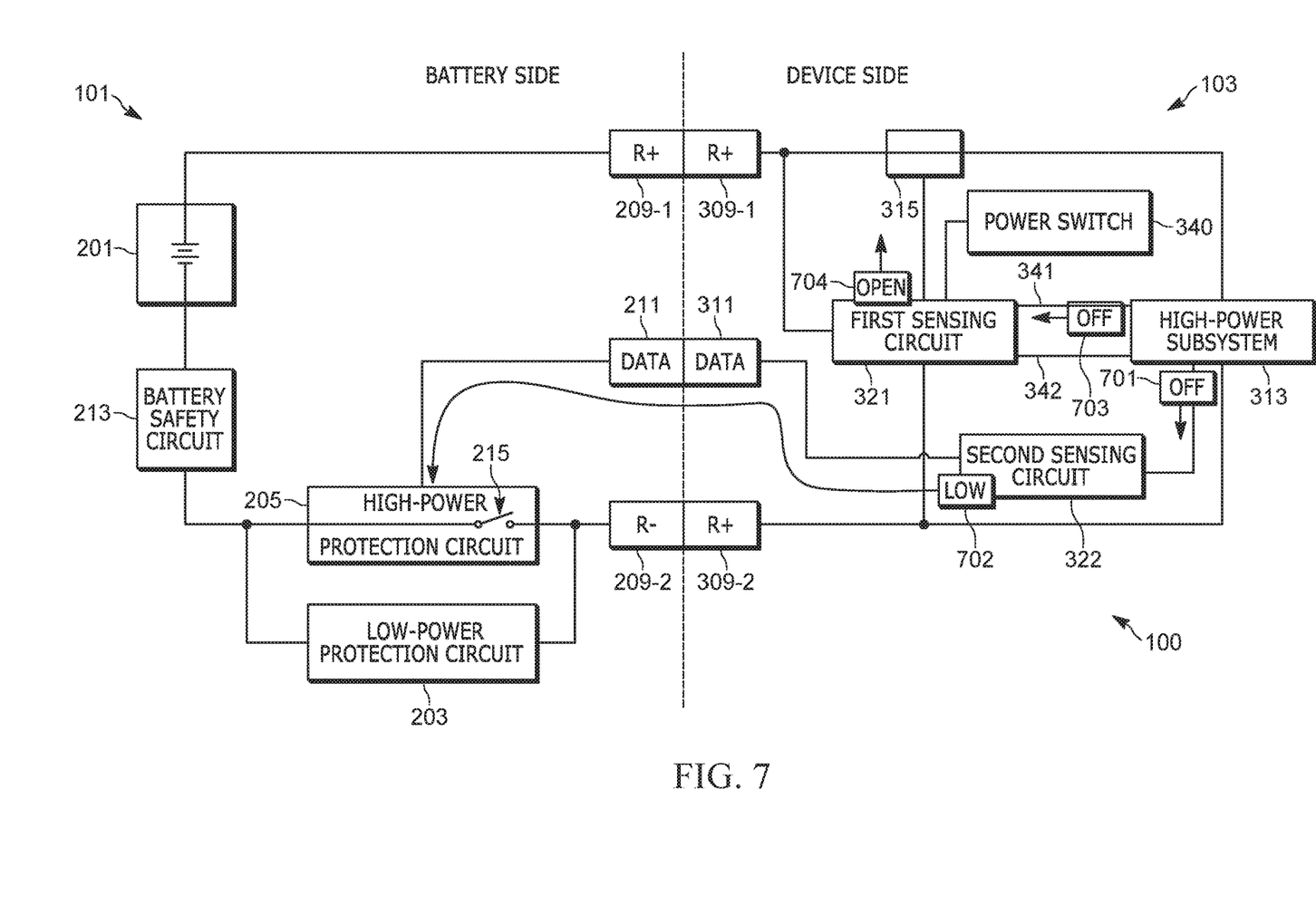
FIG. 7 depicts the example structure of the battery and the battery-powered device of FIG. 4 when powering down, in accordance with some examples.

Attention is next directed to FIG. 7 which is substantially similar to FIG. 6 with like components having like numbers. However, in FIG. 7, the device 103 is entering a power-off state and/or the first sensing circuit 321 has determined a low-battery state (e.g. by measuring the voltage of the cell 201 across the cell contacts 309). While not depicted, when the first sensing circuit 321 has determines the low-battery state, the first sensing circuit 321 may transmit a signal to the high-power subsystem to turn off, for example via the connection 342 (e.g. via a watchdog timer signal) and/or the connection 341.

In other examples, the power switch 340 may be operated to cause the device 103 to turn off which may cause the first sensing circuit 321 to transmit a signal to the high-power subsystem to turn off, for example via the connection 342 (e.g. via a watchdog timer signal) and/or the connection 341

Alternatively, the power switch 340 may be in communication with the high-power subsystem 313 (not depicted) to cause the high-power subsystem 313 to execute a power-down sequence.

Regardless, the high-power subsystem 313 executes a power-down sequence which may include, once an initial power-down sequence is executed, transmitting an "OFF" signal 701 and/or indication to the second sensing circuit 322 which in turn causes the second sensing circuit 322 to transmit an indication 702 (e.g. a data-low signal) via the data interfaces 211, 311 to disable the high-power protection circuit 205 (e.g. to cause the switch 215 to open). Thereafter the high-power subsystem 313 is again powered via the low-power protection circuit 203. When the power-down sequence is completed, the high-power subsystem 313 transmits an indication and/or signal 703 to the first sensing circuit 321 to cause the first sensing circuit 321 to signal 704 the switch 315 to open (e.g. to open the gate of the FET of the switch 315). The system 100 returns to the state depicted in FIG. 4. The signal 704 may hence include lowering and/or cutting voltage from the gate of the FET of the switch 315 and/or removing the power 401 from the gate of the FET of the switch 315.

Indeed, in the state depicted in FIG. 4, leakage current of the battery 101 is reduced due to the high-power protection circuit 205 being disabled (e.g. and not drawing power) and also due to the switch 315 being open such that the high-power subsystem 313 doesn't draw power (e.g. via the low-power protection circuit 203). While the first sensing circuit 321 may draw power, such a power draw is generally small as compared to the high-power subsystem 313.

While operation of the battery 101 is described with respect to the battery 101 being controlled by the second sensing circuit 322 of the device 103, in other examples, the battery 101 may be controlled by any suitable device having a circuit and data interface similar to the second sensing circuit 322 and the data interface 311. For example, a charger may include a circuit and data interface similar to the second sensing circuit 322 and the data interface 311 and enable and/or disable the high-power protection circuit 205 of the battery 101 according to data-high and data-low signals as described above.

Similarly, the device 103 may be used with other types of batteries and may or may not include the second sensing circuit 322. When the device 103 does not include the second sensing circuit 322, leakage current from a battery is still reduced when the device 103 is powered-down due the first sensing circuit 321 opening the switch 315.

Hence, provided herein is a device, battery and system to reduce battery leakage. A battery is provided with a high-power protection circuit and a low-power protection circuit connected in parallel, each of which protects the battery from power-surges and the like at cell contacts. However, the high-power protection circuit may draw power to operate which may reduce the shelf-life of the battery. As such, the high-power protection circuit may be disabled and enabled via indications and/or data signals received via data interface of the battery to place the battery into a storage mode (e.g. when the high-power protection circuit is disabled) or an operating mode (e.g. when the high-power protection circuit is enabled). A device that mates with the battery is provided which may transmit the indications and/or data signals to disable and enable the high-power protection circuit. The device is further provided with one or more sensing circuits that detect when the device is to be powered-on or powered-down and, in response, respectively closes or opens a switch to a high-power subsystem. When powering down, the high-power subsystem may indicate to the one or more sensing circuits when to turn off the switch to complete the powering down. Similarly, when powering down, the high-power subsystem may indicate to the one or more sensing circuits when to transmit the indications and/or data signals to disable and enable the high-power protection circuit. Hence, reducing the leakage current of the battery and/or the device by one or more of disabling the high-power protection circuit of the battery and turning off a switch to a high-power subsystem of the device may extend the life and/or the shelf-life of the battery and/or the device.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A battery-powered device comprising:
    battery-cell contacts;
    a high-power subsystem used in an operating state;
    a switch between the battery-cell contacts and the high-power subsystem; and
    a sensing circuit configured to:
        in response to determining one or more of a power-off state and a low-battery state: open the switch to the high-power subsystem; and
        in response to determining a power-on state: close the switch to the high-power subsystem to place the high-power subsystem into the operating state,
    wherein the sensing circuit comprises a combination of one or more capacitors and one or more resistors to provide power to the switch according to a time constant, the time constant selected to enable the sensing circuit to draw sufficient power from a battery via the battery-cell contacts to close the switch over a time period determined by the time constant to limit inrush current from a battery to prevent sparking at the battery-cell contacts.

2. The battery-powered device of claim 1, wherein the sensing circuit is further configured to: determine one or more of the power-off state and the low-battery state via communications with the high-power subsystem.

3. The battery-powered device of claim 1, further comprising a power-on switch, wherein the sensing circuit is further configured to: determine the power-on state via communications with the power-on switch.

4. The battery-powered device of claim 1, wherein the sensing circuit is further configured to: in response to determining both a power-on state and the low-battery state: not close the switch, and power-down the battery-powered device.

5. The battery-powered device of claim 1, wherein the switch comprises a field-effect transistor.

6. The battery-powered device of claim 1, wherein:
    the battery is configured to supply the power according to a higher power and a lower power, the higher power being higher than the lower power; and
    the time constant is further selected to enable the sensing circuit to draw sufficient power from a battery via the battery-cell contacts to close the switch over the time period using the lower power.

7. The battery-powered device of claim 6, wherein the lower power is initially supplied by the battery when the battery-powered device is in the power-on state.

* * * * *